Dec. 8, 1936.   J. MARTIN-BINACHON   2,063,719
STABILIZING DEVICE FOR VEHICLES
Filed March 16, 1934    2 Sheets-Sheet 1

J. Martin-Binachon
INVENTOR

By Marks&Clark
ATTYS.

Dec. 8, 1936.  J. MARTIN-BINACHON  2,063,719
STABILIZING DEVICE FOR VEHICLES
Filed March 16, 1934  2 Sheets-Sheet 2

J. Martin-Binachon
INVENTOR

By Marks & Clerk
Attys.

Patented Dec. 8, 1936

2,063,719

UNITED STATES PATENT OFFICE 2,063,719

STABILIZING DEVICE FOR VEHICLES

Jean Martin-Binachon, Pont-Salomon, France, assignor to General Motors Corporation, Detroit, Mich., a corporation of Delaware Application March 16, 1934, Serial No. 715,985
In France March 29, 1933

2 Claims. (Cl. 267—11)

Stabilizing devices for vehicles are known which consist in a connection constituted by pivoted levers and provided between each axle and the chassis, these levers being associated together so as to form, in a vertical plane parallel to the axle, a system of distortable four-bar motions allowing relative vertical displacements of the axle and of the chassis, but maintaining the parallelism of these parts as well as the distribution of the masses.

The invention has for its object improvements in stabilizing devices of the general type above mentioned and in all similar devices.

The improvements forming the subject-matter of the invention are characterized by the fact that, in order to allow the use of the joints connecting the axle to the chassis are arranged parallel links or elements respectively rigid with one of the levers or connecting rods constituting each of these joints, these parallel links or elements being connected together by a connecting bar, or any means capable of fulfilling the same function, which transmits the stresses from one side to the other.

The invention relates to various forms of construction and particularly to the following points, applied separately or according to any combinations:

(a) On said joints are arranged sets of double links parallel in pairs and connected together by two tension cables.

(b) Both joints are connected by cables guided on suitably arranged pulleys and on which are interposed resilient members ensuring their tension and limiting the stresses transmitted from one side to the other.

(c) Both opposite joints are connected, when longitudinally assembling the shock absorbers, by a tube operating under torsion and transmitting the stresses from one side to the other.

(d) The longitudinal opposite shock absorbers are connected by a tube rigidly secured on the arms of the shock absorbers, rubber bumpers ensuring the required resiliency to the control.

(e) When the longitudinal shock absorbers face each other, a tube is provided which can freely rotate on the ends of the shock absorbers, flat and resiliently distortable blades twisted at 90° or in the shape of a gimlet transmitting, by utilizing the shock absorber controls, the stresses from one side to the other, these blades being connected to the tube and fitted, in particular, in grooves or ports provided in the latter.

(f) When the longitudinal shock absorbers face each other and when the shock absorber controls are rigid, the connection is constituted by a spring leaf operating under torsion.

The invention further relates to other particular points which will appear from the following description with reference to the accompanying drawings, given by way of example only, in which:

Figs. 1, 2, 3, 4, and 5 diagrammatically illustrate various forms of construction of an improved stabilizing device according to the invention.

Figure 1:
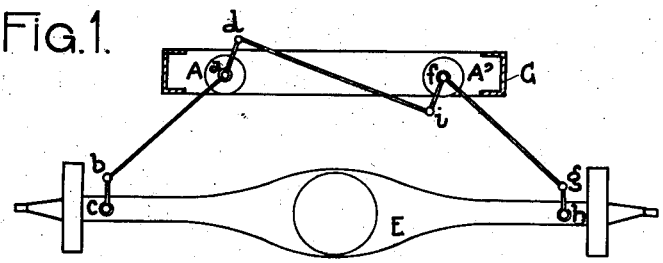

In Fig. 1, C designates the chassis of the vehicle and E one of the axles. The connecting rods a—b and b—c, on the one hand, f—g and g—h on the other hand, transmit the relative movements of the axle and chassis to the shock absorbers A and A' secured on the latter. Parallel links a—d and f—i are rigidly secured to the connecting rods a—b and f—g, so as to effect the same angular movement as the latter about the points a and f. The ends of these links are connected by a connecting bar d—i, which transmits the stresses from one side to the other. It is advantageous to give to this connection a certain suppleness. This result can be obtained, in particular, by interposing on the length of the bar d—i a spring box with or without a liquid shock absorbing device, or by forming this bar of a suitable spring, or by rendering the links a—d and f—i flexible.

Figure 2:
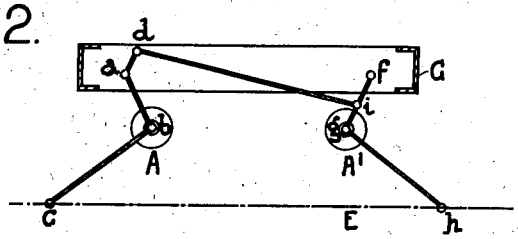

The links a—d and f—i can be mounted in different positions relatively to the connecting rods a—b and f—g. In particular, they can be in alignment with the latter, or the joint d, for instance, can be arranged between the axes a and b. These links can moreover be secured to the lower connecting rods b—c and g—h instead of the connecting rods a—b and f—g. Likewise, the shock absorbers A and A' can be mounted at any points of the joints having a suitable relative displacement. The connecting rods a—b and f—g can finally have an inclination different from that shown in Fig. 1, particularly as indicated in Fig. 2. In this figure, the pivot point i of the bar d—i is located between the axes g and f, and the shock absorbers A and A' are arranged at points b and g.

Figure 3:
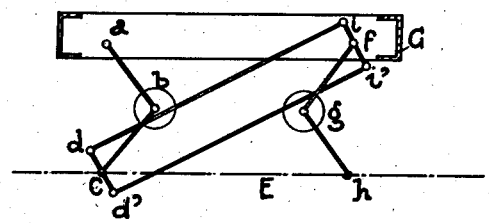
Figure 4:
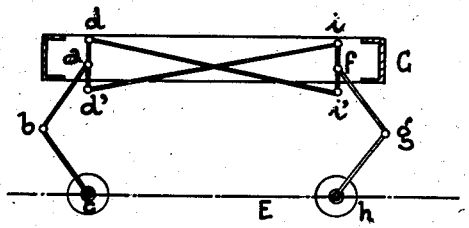

Instead of a bar d—i connecting the simple links, as in the preceding examples, it may be convenient to use a double set of links parallel in pairs and connected by two cables operating solely under a traction stress. This system can be constructed in various manners. In case the double links c—d, c—d' and f—i, f—i' are mounted on spindles c and f rotating in the same direction when the axle moves parallel to the plane of the chassis (see Fig. 3), it is convenient to connect them by parallel cables d—i, d'—i'. If links a—d, and f—i, f—i' mounted on spindles rotating in reverse direction (see Fig. 4) are under consideration, the cables d—i' and d'—i must then cross each other.

Figure 5:
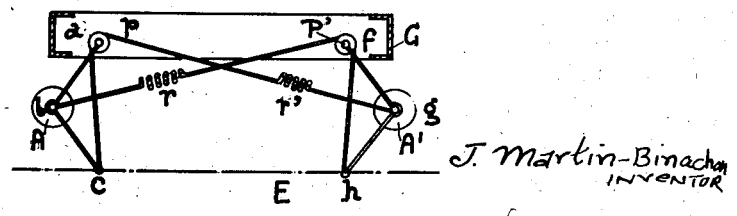

The most important factor for the stabilization of the vehicle being a constant distribution of the masses, it is possible to use, for carrying the invention into practice, assemblages less accurate than the preceding ones, by interposing resilient members in the connecting cables. Fig. 5 shows an example of such an assemblage. Two loose pulleys, P, P' are mounted, for instance, on spindles a and f serving as fixed points for the shock absorbers A and A'. A cable attached at c passes over the pulley P and is attached at g; a second cable attached at h, passes over the pulley P' and is secured at b. Suitable springs r and r', provided on these cables, ensure their tension and limit the stresses transmitted.

If the shock absorbers are mounted parallel to the longitudinal axis of the vehicle, instead of being transversely arranged as in the preceding drawings, transmission pulleys can be arranged at 90°, or a member transmitting the torsion stresses (preferably a tube) can connect two joints of the shock absorbers rotating in the same direction when the axle moves parallel to the chassis.

Figure 6:
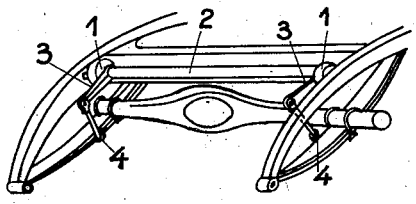
Fig. 6 is a perspective view of a form of construction with longitudinal shock absorbers.

In the example illustrated in Fig. 6, the longitudinal shock-absorbers 1 are mounted in the ordinary manner. The shock absorbers facing each other are connected by a tube 2 rigidly secured on the arms 3 of the shock-absorbers 1. Moreover in order to impart to the control a certain resiliency, rubber bumpers are provided at 4.

Figure 7:
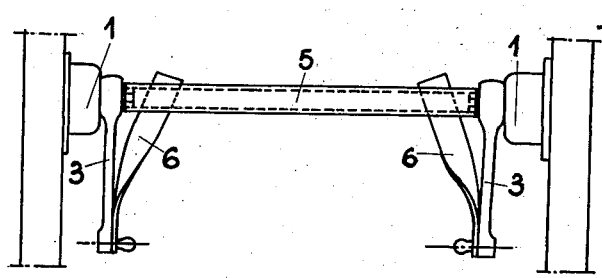
Fig. 7 is a plan view of another form of construction.

Fig. 7 illustrates another form of construction in which the longitudinal shock absorbers 1 face each other in the usual manner. A tube 5, which can freely rotate on the ends of the shock absorbers 1, has connected thereto two resiliently distortable blades 6 secured to the arms 3 of the shock absorbers 1. These blades 6, which are simple flat blades, are twisted at 90° or are in the shape of a gimlet and are fitted in longitudinal grooves of the tube 5. These blades transmit, by utilizing the controls of the shock absorbers and the tube 5, the stresses from one side to the other.

Figure 8:
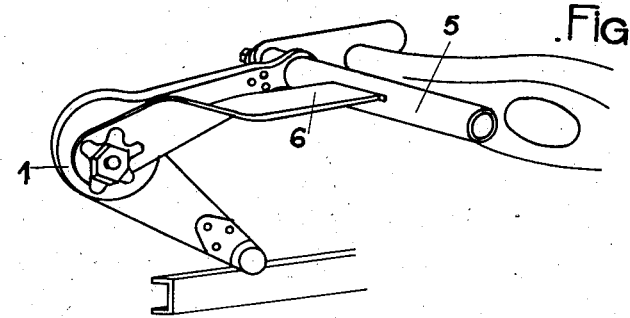
Figs. 8 and 9 are perspective views of constructional modifications.

Fig. 8 corresponds to the preceding figure, the assembly being effected on friction shock absorbers.

Figure 9:
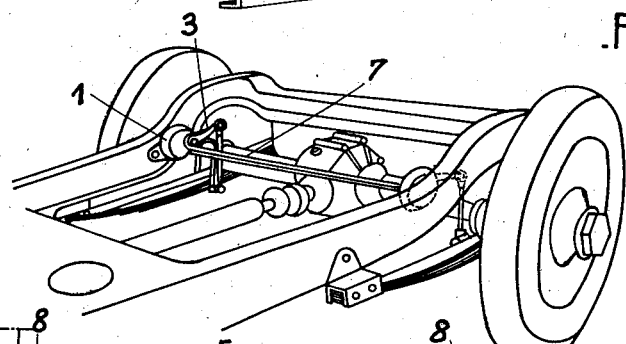

Fig. 9 is a constructional modification of Fig. 6. In this modification, the controls of the shock absorbers are rigid, and the connection is effected by a resiliently distortable blade 7 operating under torsion.

Figure 10:
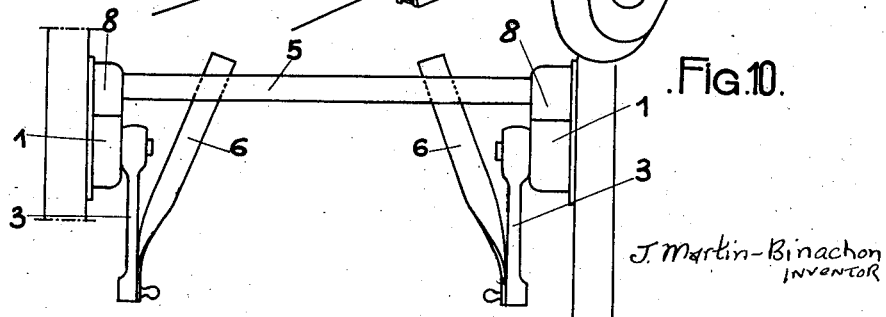
Fig. 10 is a plan view of another modification.

Fig. 10 illustrates a constructional modification of Fig. 7 in which the tube 5 is journalled on members 8 independent of the shock absorbers.

All modifications which do not alter in any way the main features above set forth and the desired result, remain included in the scope of the present invention.

What I claim as my invention and desire to secure by Letters Patent is:

1. A stabilizing device including a chassis element, an axle, and spring elements connecting the chassis and axle, a lever system connecting one spring element through the chassis with the other spring element, shock absorbers, one associated with each spring, the several shock absorbers being interposed in said lever system, said lever system including a tube rotatably mounted between the shock absorbers, and including resiliently distortable blades, one end of each blade connected to one end of said tube and the other end of each blade connected to the adjacent shock absorber.

2. A stabilizing device as claimed in claim 1 wherein said tube is provided with radial slots adjacent its ends, said slots adapted to receive one end of each of the resiliently distortable blades.

JEAN MARTIN-BINACHON.